Nov. 10, 1970  ICHIRO HIROSE  3,538,557
SNAP FASTENER
Filed Nov. 6, 1967
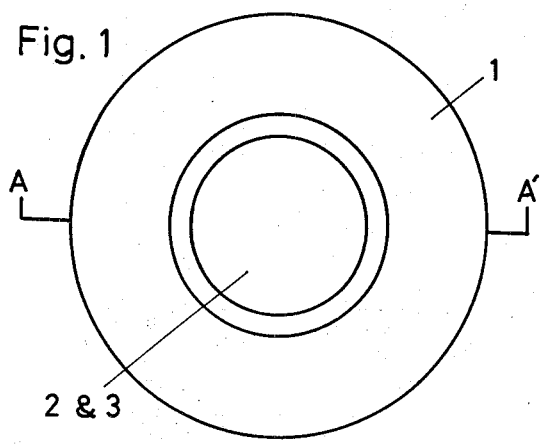
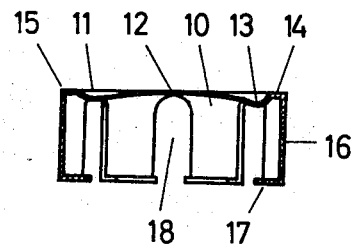
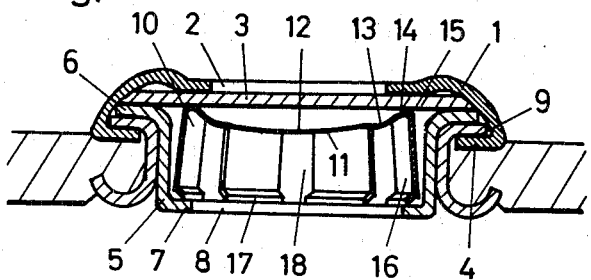
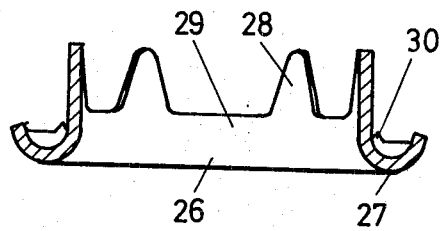
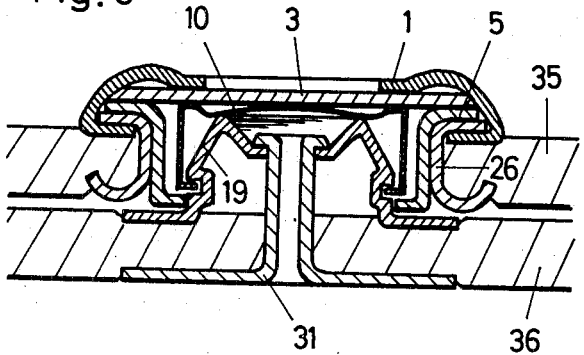
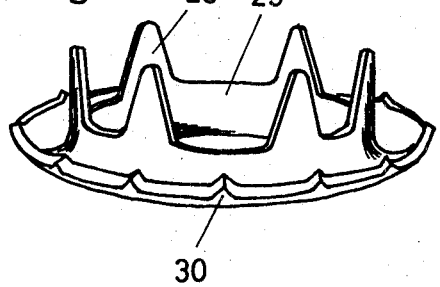
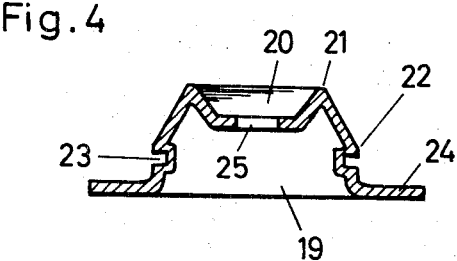
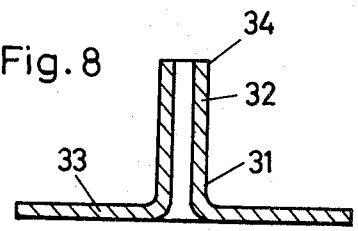
INVENTOR
I. Hirose

United States Patent Office 3,538,557
Patented Nov. 10, 1970

3,538,557
SNAP FASTENER
Ichiro Hirose, 110, 14, 5-ban 4-chome, Chiyoda-ku,
Iidabashi, Tokyo, Japan
Filed Nov. 6, 1967, Ser. No. 680,939
Claims priority, application Japan, Nov. 18, 1966
(utility model), 41/105,806
Int. Cl. A44b 17/00
U.S. Cl. 24—217                                1 Claim

ABSTRACT OF THE DISCLOSURE

A snap fastener consisting of a male part and a female part is used for connecting and separating two articles. The female part is featured by a resilient clamp ensuring clamping and release of the male part and particularly stability of clamping whereby separation is not possible without intended operation though simple and easy. The resilient clamp includes fingers that are engageable with a groove in the female part for separably coupling them together.

This invention relates to a snap fastener for connecting and separating two parts of a single object or two parts of different objects generally used for purses, hand bags, canvasses, and other varieties of articles.

An object of the invention is to provide an improved snap fastener having, in combination, a female part comprising an outer cover, a casing, a baffling piece, a resilient clamp, and a fixing piece, and also a male part having a hollow fixing pin and a base.

Another object of the invention is to provide a snap fastener having a resilient clamp characterized by an annular depression provided on its periphery.

Still another object of the invention is to provide a snap fastener having a baffling piece specifically provided in the casing in order to lessen the pressure applied on the resilient clamp and to give an ornamental effect to the snap fasteners.

To obtain these and other objects the invention employs the principle which is known usually for a resilient disk of a sheet metal wherein upon a pressure being applied on the central portion of the sheet metal in opposite direction the surface is caused to assume a concave position.

With conventional devices incorporating the same principle now in view, the invention provides for a novel snap fastener which comprises several particular components much improved and modified in configuration and exceeding the prior arts both in quality and efficiency.

The conception of the invention will be more easily understood from the illustration given in reference to the appended drawings in which one embodiment of the invention is shown only by way of example.

In the drawings:

FIG. 1 is a front view of a snap fastener according to this invention;

FIG. 2 is a cross section of a female part along the line A—A' in FIG. 1;

FIG. 3 is a cross section along the line A–A' in FIG. 1 of the snap fastener in which the male part and the female part are in engagement;

FIG. 4 is a cross sectional elevation of a male part;

FIG. 5 is a vertical cross sectional view of a resilient clamp in a convex position;

FIG. 6 is a cross sectional elevation of a fixing piece for the female part;

FIG. 7 is a perspective view of a fixing piece for the female part;

FIG. 8 is a cross sectional view of a fixing pin for the male part.

Thus the snap fastener according to this invention provides for a construction essentially consisting of a female part including an outer cover 1, a baffling piece 3, a resilient clamp 10, a casing 5, and also a male part 19 with a fixing pin 31.

Referring now to the drawings, 1 is an outer cover for housing an inner construction. Although the outer cover 1 is shown in a circular shape in the drawings, it is likewise possible to vary its material and size to increase its ornamental value. The upper surface of the outer cover 1 has an opening 2 which is provided for pressing the baffling piece 3 and the resilient disk 11 which contains the spherical surface 12, annular depression 13 and the periphery 14, therethrough. The diameter of the opening 2 must be a little smaller than the outer diameter of the resilient disk 11. The lower edge 4 of the outer cover 1 fits the upper edge 6 of the casing 5 later described having an interspace 9 between the lower edge 4 of the outer cover 1 and the upper edge 6 of the casing 5. 3 is a baffling piece which is as for example of a plate-shaped made of leather, cloth, resin, rubber or special paper material to be coloured or printed and has an adequate thickness, resiliency and endurance as well as ornamental surface. The baffling piece 3 is housed within the outer cover 1 and the casing 5, the middle portion of the baffling piece 3 being disclosed to the outside through the opening 2. The outer cover 1 may be of the metallic, resinous or other material and the baffling piece 3 of the soft and ornamental material. The baffling piece 3 may often be same in material as the bases 35 or 36, and it is capable of protecting inner construction from being exposed to the outside and of avoiding direct pressing and hard pushing touch effected thereon. There is required an interspace 9 adequately between the upper edge 6 of the casing 5 and the lower edge 4 of the outer cover 1 since the lack of a baffling piece 3 will cause unstable housing of the resilient clamp 10 in the casing 5 consequent on the obstruction of free operation of the resilient clamp 10. Pushing of the baffling piece 3 will give a soft and agreeable touch on the resilient clamp 10 and keep it stable in the casing 5 whereby uniform pressing force is transmitted to the surface of the resilient disk 11. The resiliency of the baffling piece 3 will prevent shocks at the time of both engagement and disengagement of the male part and the female part, occurrence of undesired interspace between the two parts and fit both parts with each other congruously. The surface of the baffling piece 3 can usually be pretreated in some or other way so as to avoid damage or disquality caused from successive pushing and to endure the use in a long time. The baffling piece 3 may be printed marks thereon such as Push" or others to avoid misuse.

10 is a resilient clamp which has legs 16 of definite widths extending from the peripheral edge 15 of the resilient disk 11, said legs 16 being bent downwardly from the resilient disk 11 and the end of each leg 16 being folded inwardly forming a hook 17 at a right angle with each leg. Between the legs 16 there are provided spaces 18 at equal distances with each other. The end of the hook 17 is of an arcuate shape. The surface of the resilient disk 11 makes a right angle with said leg 16. The bent portion 15 may be rounded at the corner of the periphery 14 in an adequate manner.

As described above, one of the outstanding features of this invention is that the resilient disk 11 has an annular depression 13 on the outer periphery thereof and there is provided a convex spherical surface 12 inside the annular depression 13. More preferable is that the central portion 12 of the resilient disk may be on the same plane as the periphery 14 of the resilient disk 11. Each leg 16 extends from the periphery 14 of the resilient disk 11 and defines a space 18 with an adjacent leg, said space 18 being formed in a semicircular shape which is made extremely deep at the root of the leg 16.

The resilient clamp 10 described is housed in the casing 5. The upper part of the resilient clamp 10 is supported by the outer cover 1 and the baffling piece 3 and the lower part 4 of the outer cover 1 are supported by the upper edge 6 of the casing 5. The resilient clamp 10 of this invention is thus featured by that the annular depression 13 provided on the periphery of the resilient disk 11 is provided so as to allow the resilient disk 11 to assume a convex or concave position effectively for serving as a two stage spring for imparting even force to the periphery of the resilient disk 11. The annular depression 13 provides a larger area to the resilient disk 11 and enables the disk surface 11 to assume a convex or concave position easily. It has been observed that the resilient disk 11 of the invention is far more efficient in operation than any known spherical disk surface having no annular depression. With the surface area of the resilient disk 11 thus enlarged, the resilient disk 11 can be manufactured thinner than usual and the pushing force can be lessened so as to permit the resilient clamp 10 easily engageable or disengageable with or from the male part by slight touching contact. The depression 13 can be made quite thin to allow the action of the central spherical portion 12 to be transmitted freely to the legs 16 of the resilient clamp 10.

The annular depression 13 therefore can add doubled resilient effect to the resilient disk 11 of the clamp 10 and raise its function. In view of the conventional resilient disks which generally consist of a single surface, the invention provides for possibility of producing a composite force more efficiently than such single resilient disk. When the central portion 12 is pressed downwardly, the tension force imparted on the periphery 14 and 15 and consequent expansion of the disk 11 are cancelled by resiliency of the annular depression 13 and reduced in strength more than in a single resilient disk. This results in that the variation from a convex to a concave position is carried out much easier and the cracks which may occur at the root of the leg 16 can effectively be avoided as the annular despression 13 will serve baffling against the shock produced in the central portion 12 and thus making the convex and concave positions retained more stable.

It is not desirable however that the strain produced during the manufacture and retained in the central position 12 will transmit a reactionary force of the resilient disk 11 to each leg 16 in an uneven way. This disadvantage is met by uniform adjustment and transmission of force to each leg 16 by means of the annular depression 13 through the accurate convex and concave action of the resilient disk 11 and the precise movement of the legs 16 to open or close. Since it is rare to provide similar configuration in the convex and concave positions on the resilient disk 11, the variation from a concave position to a convex position appears in a non-uniform manner so that the pushing force is not transmitted uniformly to each leg 16. If the pushing force applied on the central portion 12 reaches the annular depression 13, the force is once moderated and then transmitted to each leg 16 whereby unbalanced forces are set off completely.

The second importance of the resilient disk 11 lies in the roundness of its periphery. Convex and concave positions of the resilient disk 11 and the opening and closing of the legs 16 will be effected by a layer action wherein the edge 15 is assumed as a fulcrum and the pushing point of the resilient disk a power point and a hook 17 of a leg 16 a working point. Therefore, if the roundness of the edge 15 is too large, the edge 15 as a fulcrum will lose its function so that the curvature in radius of the resilient disk 11 should possibly be small. If the curvature is too large there will grow fatigue on the edge 15 and efficient function of the leg 16 will be lost. Consideration is necessary therefore to obtain a fair combination of the periphery 14, area of the resilient disk 11 and its construction, lengths of the legs 16 and angles between the resilient disk 11 and the legs 16. Adequate roundness of the edge 15 can meet the requisite of stabilizing the function of the resilient disk 11 and will raise its efficiency.

Thirdly, the periphery 14 of the resilient disk 11 is molded on a plane same in level as the contact portion of the resilient disk 11 consequent on that upon the parts being assembled the periphery 14 will not be strongly pressed by the outer cover 1 or the baffling piece 3 but will secure stable convex and concave positions for the resilient disk 11. The described single spherical surface disk having legs 16 of same length as in this invention may be subjected to compression by the outer cover in the convex position and thereby made unstable. In order to avoid this disadvantage, the level of the 6 of such single spherical surface disk must be higher than that of this invention since the former will require increase of the interspace between the male part and the female part in engagement.

The fourth feature of the resilient clamp 10 of this invention lies in the arcuate form of the tip end of the hook 17 which is adapted to fit to the recess 23 on the lower side of the male part 19, whereby the engaging power of the hook 17 is increased since the tip end of the hook 17 fits the recess 23 on the lower side of the male part 19 and strengthen the clamping force of the resilient clamp. It is desirable also that the leg 16 may be molded in an arc-form in cross section.

The fifth feature of the resilient clamp 10 of this invention is that the interspace 18 between adjacent legs 16 is notched extremely deep up to the peripheral edge 15 of the resilient disk 11. It is observed that if the space is out in the middle of the leg is in conventional devices there will not be effected sufficient expansion of the resilient disk 11 due to its convex and concave action although it may give a certain protection to the leg 16. This will surely obstruct free convex and concave action of the resilient disk and reduce the effect of action and the stroke of the leg 16. The 16 of the resilient disk is of such construction as capable of making a satisfactory movement, in which the semicircular notch at the upper end of the space 18 will prevent the cracks produced in the legs 16.

As the sixth feature of the invention, the construction of the resilient disk 11 and the stroke of the leg 16 are provided so as to minimize the size of the disk as much as possible. If the stroke is too large, the casing 5 must accordingly be large so that minimum size of the device may not be obtained. Comparing the construction of the resilient disk of a single spherical shape with this resilient disk 11 considering the diameter of said disk 11 and the length of the leg 16 being equal, it is clear by experiment that the latter disk excels the former. Magnitude of the stroke is usually in proportion to the maximum distance between the upper spherical surface 12 of the resilient disk 11 and the bottom surface. Under the same condition, the former must be larger than the latter. It has been found that if the ratio of said maximum distance and the diameter of a single spherical surface is applied in the single spherical surface, said maximum distance will increase much larger and the stroke will exceed over the range as desired. In this invention, the annular depression 13 is provided so as to adjust the convex and concave action of the resilient disk 11 and transmit said action to the edge 15 so that the best stroke can be provided in the device. Thus the resilient disk 11 of this invention makes it possible to obtain a minimum size for the connection device of this kind.

It is preferable that the resilient disk may be heat-treated previously to assure endurance and accuracy of the convex and concave position of the resilient disk. If it is nonheat-treated previously, the resilient disk is not capable of effecting a proper function due to its convex and concave action which will result in the failure of precise movement and weakening of the clamping force, because, essentially, the resilient materials must be used after its proper heat treatment. This is chiefly due to double distortion of material produced in the course of cold working and press working. By adequate heat treatment the distortion caused from the manufacture may be avoided and a proper resiliency is obtained.

The described advantages will contribute to complete performance and efficiency of the connecting device of this invention. Other considerations such as providing for semicircular projections on the reverse side of the resilient disk opposite to the annular depression 13 may also produce a composite force of resiliency but it will make the construction too complex and in addition produce disadvantages in the method of transmission of convex and concave action from the resilient disk 11 to the legs 16.

Illustration will now be given on the other important features of the invention. In the drawings, 5 is a casing which is of a cylindrical shape and has an upper edge 6 projecting outwardly and a lower edge 7 folded inwardly at the lower part. After the resilient clamp 10 is housed in the casing and the lower edge 4 of the outer cover 1 and the upper edge 6 of the casing 5 are fitted to each other, there is formed a frame for the female part. The upper edge 6 of the casing is similar in shape as the upper surface of outer cover 1. It is required that the level of the upper edge 6 of the casing 5 is equal to the level of the resilient clamp 10 upon being in a convex position and the inner diameter of the casing 5 at its bottom is equal to the outer diameter of the lower end of the leg 16 of the resilient clamp 10 in a concave position. Further, the diameter of the opening 8 at the bottom of the casing formed by the lower edge 7 of the casing 5 is required a little larger than the outer diameter of the male part 19 later described. The curved portion of the casing 5 is rounded adequately so that a horn-like projection 28 of the fixing piece 26 may be guided to be pressed into the interspace 9. Thickness of material of the casing 5 may preferably be larger than the width of the recess 23 on the male part 19 so as to prevent the lower edge 7 of the casing 5 from being caught into the recess 23.

26 is a fixing piece for securing the female part to the base material and has a plurality of horn-like projections 28 projected from the inner periphery of a washer 27 which is arcuate in cross section, a belt part 29 between the horn-like projections 28, and pins 30 from the outer periphery of the washer 27 respectively in the same direction. The pins 30 are fitted to the base material to secure the female part snugly and the horn-like projection 28 is inserted into the interspace 9 for fixing the female part. Length of the horn-like projection 28 and the arcuate form of the washer 27 can of course be adjusted by the thickness of the base material 35. According to another method, the pin 30 may be provided on its outer periphery which is folded inwardly to be fitted adequately thereto for preventing thin cloth material from being injured.

19 is a male part which is of a circular shape and has an edge 24 at its lower part. The upper part has an annular edge 21 having a hollow part 20 which forms a space in which the spherical part 12 of the resilient clamp 10 in concave position fits its edge 21 and serves to push upwardly the spherical part 12 of the resilient clamp 10 to take a convex position. There is provided a recess 23 on the lower side of the annular edge so as to engage with hooked portion 17 of the resilient clamp 10. Said recess 23 is provided for protecting the hook 17 and strengthening the grip of the resilient clamp 10 so that the tension force may properly act on the root of the hook 17 but not on the end of the hook 17 when the hook 17 fits into the recess 23. There is provided an aperture 25 in the middle of the bottom of the hollow part 20.

The maximum diameter of the lower side 22 of the male part 19 is a little smaller than the diameter of the end of the hook 17 when the resilient clamp 10 is in a concave position and it may desirably be equal to the diameter of the hook 17 at the lower end of the resilient clamp 10 when the latter is in a concex position.

31 is a fixing pin by which the male part is secured rigidly to the base material 36. The fixing pin 31 has a hollow part 32 in the centre and it has a seat 33 at its lower part. The circular edge 24 of the male part 19 and the seat 33 hold the base material 36 securely and fit the head 34 into the aperture 25.

Operation of the snap fastener of this invention will now be described. The male part 19 is fitted into the opening 8, and then the annular edge 21 pushes up the resilient disk 11 of the resilient clamp. When the resilient clamp assumes a convex position, the legs 16 close, the hook 17 engages with the recess 23 on the male part and the male part and the female part engage with each other. When user pushes the central part of the baffling piece 3 up, the resilient disk 11 is depressed and assumes a concave position whereupon the legs 16 open and the hook 17 is disengaged from the recess 23 and thereby the male part leaves from the female part.

In summary, the features of the snap fastener of this invention follow:

(1) Performance of engagement and disengagement of the male part and the female part is more increased than in known snap fasteners by that such operation of engagement and disengagement is made possible by single touch of a finger. Advantages and values of the device are thus much elevated.

(2) The baffling piece 3 serving as a part enhances the function and decorativeness of this snap fastener.

(3) The resilient clamp 10 of outstanding performance brings a functional effect extremely fitted for engaging means.

(4) Manufacture into a small size possible and therefore practical utility is enlarged.

(5) Fitting of both the male and the female parts is made much simpler and more ensured resulting in wider practicability.

While a particular embodiment of this has been herein illustrated and described, it is not intended to limit the invention to such disclosure, but changes and modifications may be made without departing from the spirit of the invention within the scope of the following claim.

What I claim is:

1. A snap fastener for connecting and separating a first part and a second part, said first part forming a female part which comprises: a cover having an opening in the middle and folded downwardly from its outer periphery, a resilient clamp made of a thin sheet metal and circular in configuration on the upper part having a convexed portion in the middle, an annular groove on its periphery and an annular flat portion surrounding said annular groove, said clamp having a plurality of legs extending downwardly from and at right angles to its outer periphery, said legs having recesses between each other and each recess being semicircular in shape at the uppermost part, the forward end of the leg being bent inwardly at right angles thus forming a hook for clamping a neck of a second part, a flexible and thin baffling piece between said cover and said clamp, a casing having a cylindrical portion of a height adapted for housing said resilient clamp and at the lower periphery forming an inward flange for supporting said resilient clamp and at the upper periphery having an outer flange for connection with said cover by caulking, a fixing member having a flange of a semicircular cross section and a plurality of triangular projections extending upwardly and arranged at equal intervals on the inner wall of said flange, said projections being adapted to penetrate through cloth, leather, metal and like material from its back surface and coming into a space between a lower end of the cover and a portion of the upper flange of the casing in order to securely hold the female part to the material, and said second part forming a male part having a circular body with an annular elevation on the upper portion thereof, an annular recess being cut upwardly deep inside and a flange extending outwardly at the lower part of the body.

References Cited

UNITED STATES PATENTS

| | | | |
|---|---|---|---|
| 443,792 | 12/1890 | Pringle | 24—217 |
| 487,175 | 11/1892 | Courcel | 24—217 |
| 558,012 | 4/1896 | Chase | 24—216 |
| 1,656,037 | 1/1928 | Carr | 24—217 |
| 2,256,849 | 9/1941 | Purinton | 24—217 |
| 2,759,238 | 8/1956 | Williams | 24—216 |
| 2,816,340 | 12/1957 | Domenech | 24—217 |

FOREIGN PATENTS 100,313   5/1916   Great Britain.

BERNARD A. GELAK, Primary Examiner